Figures 1, 2:
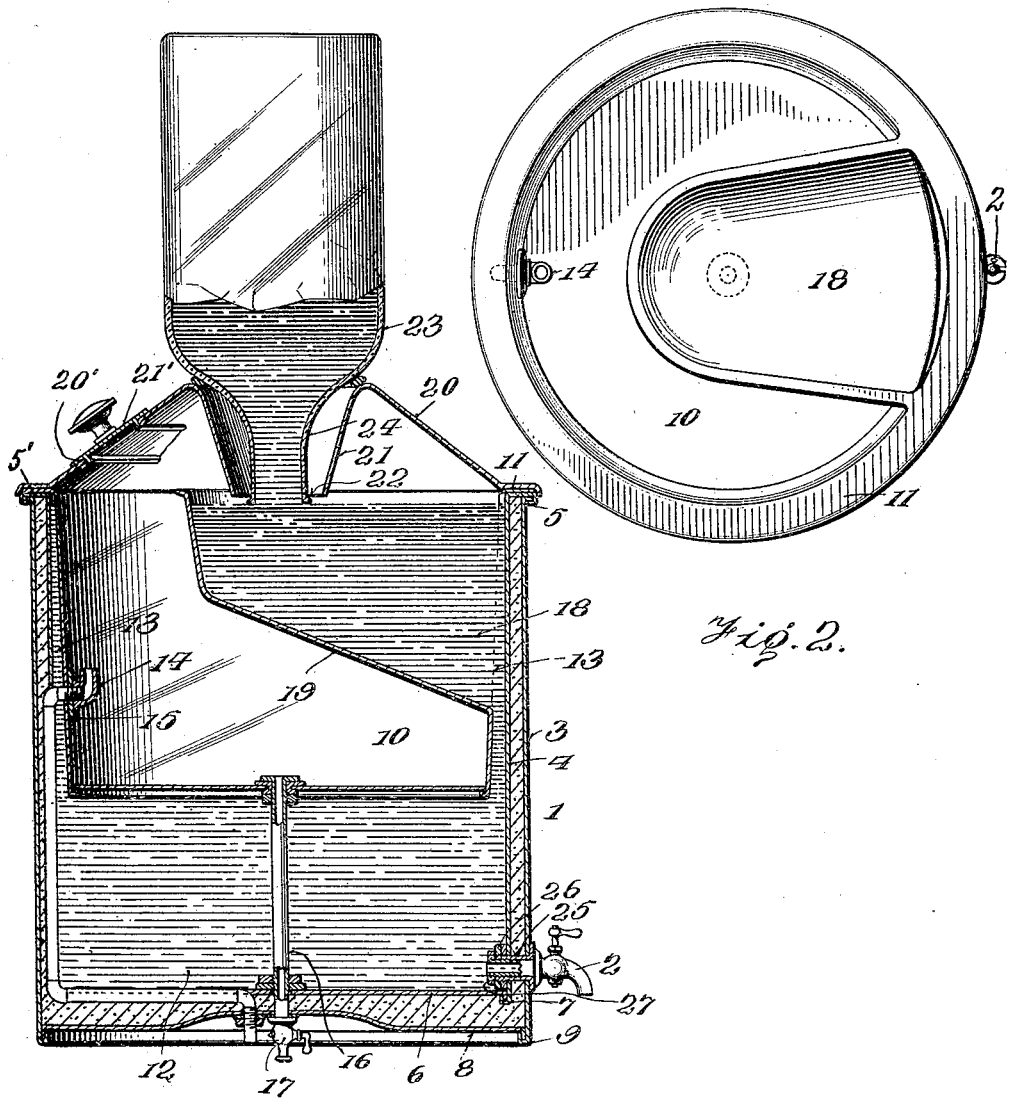

A. W. CRAM & W. A. CLARIDGE.
WATER COOLER.
APPLICATION FILED MAR. 8, 1910.

979,440.

Patented Dec. 27, 1910.

Witnesses

Inventor
A. W. Cram.
W. A. Claridge.
By
Attorney

UNITED STATES PATENT OFFICE.

ALONZO W. CRAM AND WILLIAM A. CLARIDGE, OF HAVERHILL, MASSACHUSETTS.

WATER-COOLER.

979,440.  Specification of Letters Patent.  Patented Dec. 27, 1910.

Application filed March 8, 1910. Serial No. 548,106.

*To all whom it may concern:*

Be it known that we, ALONZO W. CRAM and WILLIAM A. CLARIDGE, citizens of the United States, residing at Haverhill, county of Essex, State of Massachusetts, have invented certain new and useful Improvements in Water-Coolers; and we do hereby declare the following to be a full, clear, and exact description of the invention such as will enable others skilled in the art to which it appertains to make and use the same.

Our invention relates to improvements in water coolers, and has for its object to provide an improvement on the inverted bottle water cooler, in which the water is delivered from the original bottles without coming in contact with the ice and thus prevent any liability of the water becoming contaminated by the ice.

Another object of our invention is to provide a more simple, cheap and effective cooler of this character having certain details of structure fully set forth in the specification.

In the accompanying drawings: Figure 1 is a vertical sectional view of a cooler embodying our invention. Fig. 2 is a top plan view of the cooler with the cover removed and showing the passage for conveying the water from the bottle to the receptacle.

Referring now to the drawing, 1 represents a receptacle which as shown is of a cylindrical form having at its lower end a faucet 2, by means of which the water is drawn from the receptacle. This receptacle is preferably made of a double wall-form having the outer wall 3, and the inner wall 4, the space between which is filled with any well-known non-conducting material to prevent the contents of the receptacle from being affected by the outside atmosphere. The walls 3 and 4 of the receptacle 2 are preferably made of metal and are crimped together at their upper ends as indicated at 5, to form a flat upper end 5'. The inner wall has the bottom 6 crimped thereto as indicated at 7, and the outer wall 3 has the bottom 8 crimped thereto at 9, whereby tight inner and outer casings are formed. Within the upper end of the receptacle 2, is a tank 10, which has at its upper end the outwardly extending flange 11, which rests upon the upper edge 5' of the receptacle, and whereby the tank 10 is supported. The tank 10 is adapted to receive the ice and hold the same as said tank does not extend all the way to the bottom of the receptacle, but leaves a space 12, below the tank for the water.

The tank as shown in Fig. 1 is slightly tapering toward its lower end, so that the upper end thereof engages the inner wall of the receptacle and holds the tank against any movement. The taper of the tank leaves the space 13 in the receptacle surrounding the tank and whereby the water in the receptacle is at all times entirely surrounding the tank. The tank above the bottom has an overflow pipe 14 which extends down through the receptacle and out through the bottom of the receptacle, whereby the water in the tank is maintained at a determined level. The pipe 14 is secured to the tank by a lock-nut 15 on the inside of the tank, whereby the pipe can be disconnected when it is desired to remove the tank. The tank is also provided with a pipe 16, connected to the bottom in the same manner as the pipe 8, and which extends down through the receptacle and through the bottom of the receptacle, and is provided with a cock 17.

The tank 10 as shown is flush with the upper end of the receptacle and is provided with a passage 18, which has its inner end extended in beyond the center of the tank, and is of a broad form communicating at its outer edge with the space 13. The passage 18 does not extend to the bottom of the tank, but terminates some distance therefrom and is provided with an inclined bottom 19.

Closing the receptacle is a cover 20, having the central depressed portion 21 having the opening 22, and said depressed portion serves as a support for the bottle 23. The bottle 23 has its neck 24 extending through the opening 22 and entering the passage 18 and extending a slight distance therein. The cover 20 is provided with an opening 20' closed by a lid 21', whereby the ice may be placed in the tank 10 without removing the cover 20.

The receptacle 1 has a bushing 25 passing therethrough and secured to the receptacle by lock-nut 26. The faucet 2 passes through the bushing and is tightly secured therein by a lock-nut 27.

By this structure it will be seen that the liquid passes from the bottle through the passage 18 to the space 13 of the receptacle. The water backs up and fills the passage 18 and the neck of the bottle extending into the water in the passage and seals the water in the bottle and prevents any water from passing from the bottle. When the level of the water is brought below the neck of the bottle by drawing it from the faucet 2, the water is allowed to flow from the bottle until the water has again reached a level in the passage above the lower end of the neck of the bottle, all of which is well understood in coolers of this character.

What we claim is—

1. A cooler of the character described, comprising a receptacle, an ice tank within the upper end and spaced from the bottom and walls of the receptacle, an inverted bottle supported by the receptacle, a passage communicating with the neck of the bottle and extending across the tank and communicating with the water space surrounding the tank.

2. A cooler of the character described, comprising a receptacle, an ice tank within the upper end and spaced from the bottom and walls of the receptacle, an inverted bottle supported by the receptacle and having its neck extending into the center of the tank below the level of the upper end of the receptacle, and a passage extending from the neck of the bottle across the tank and communicating with the space surrounding the ice tank.

3. A cooler of the character described, comprising a receptacle, an ice tank within the upper end of the receptacle and spaced a distance from the walls of the receptacle, and having a passage extending from the upper end obliquely through the tank and communicating with the receptacle, and a bottle having its neck within the passage whereby the liquid is conveyed from the bottle to the receptacle.

4. A cooler of the character described, comprising a receptacle, a faucet connected to the lower end of the receptacle, an ice tank within the upper end of the receptacle and spaced a distance from the walls of the receptacle, and having an oblique passage extending from the center thereof and communicating with the space between the tank and walls of the receptacle, an overflow pipe connected to the ice tank and extending down through the bottom of the receptacle, a cover for said receptacle having a central opening above said passage, and a bottle supported by the cover and having the neck thereof passing through the opening therein and entering said passage whereby the liquid from the bottle passes to the receptacle, substantially as described.

5. A cooler of the character described, comprising a receptacle, a faucet connected to the lower end thereof, an ice tank removably supported within the upper end of the receptacle and spaced a distance from the walls of the receptacle and having an oblique passage extending from the center thereof and communicating with the receptacle above the bottom of the ice tank, an overflow pipe connected to the ice tank and extending down through the receptacle and through the bottom thereof, a drain pipe connected to the bottom of the ice tank, a cover for said receptacle having a central opening above said passage, and a bottle supported by the said cover and having the neck thereof passing through the opening therein, and entering said passage whereby the liquid from the bottle is conveyed to the receptacle, substantially as described.

6. A cooler of the character described, comprising a receptacle, an ice tank within the upper end of the receptacle and having a water space around the same, an inverted bottle supported by the receptacle, and a passage communicating with the neck of the bottle and extending across the tank and communicating with the water space around the tank.

7. A cooler of the character described, comprising a receptacle, an ice tank in the upper end of the receptacle and forming a water receiving space below the tank, a bottle supported by the receptacle and a passage from the bottle through and around the ice tank to the water space to convey the water thereto from the bottle into the water receiving space.

In testimony whereof we affix our signatures, in presence of two witnesses.

ALONZO W. CRAM.
WILLIAM A. CLARIDGE.

Witnesses:
WILLIAM D. CRAM,
GEO. WARD COOK.